Oct. 29, 1968 T. D. COE 3,407,868

SEMICONDUCTOR DEVICE COOLING

Filed July 18, 1966 2 Sheets-Sheet 1

INVENTOR.
THOMAS D. COE
BY
Wolf, Greenfield & Hieken
ATTORNEYS

INVENTOR.
THOMAS D. COE
BY
Wolf, Greenfield & Hieken
ATTORNEYS

United States Patent Office 3,407,868
Patented Oct. 29, 1968

3,407,868
SEMICONDUCTOR DEVICE COOLING
Thomas D. Coe, Winchester, Mass., assignor to Wakefield Engineering, Inc., Wakefield, Mass., a corporation of Massachusetts
Filed July 18, 1966, Ser. No. 566,099
8 Claims. (Cl. 165—80)

ABSTRACT OF THE DISCLOSURE

A semiconductor cooler is formed of sheet metal by a sample ram and die technique. The cooler has resilient, semicorcular walls which hold the semiconductor in heat conductive relationship to the planar heat transfer surface of the cooler.

The present invention relates in general to semiconductor device cooling and more particularly concerns novel apparatus and techniques for providing relatively efficient, easy-to-install semiconductor device coolers that are low in cost, relatively easy to fabricate in large quantities, and relatively lightweight.

According to the invention, a unitary structure of material of high thermal conductivity, such as aluminum, is formed with central opposed first and second semicircular walls extending perpendicularly from first and second planar surfaces joined by first and second U-shaped portions extending perpendicularly from the first and second planar portions and separated by the first and second semicircular walls so that the inside surface of the first and second semicircular walls are urged snugly against the casing of a semiconductor device to be cooled. The U-shaped portions function as resilient means for urging the inner surfaces of the semicircular walls together and as means for expelling heat. The first and second planar means provide a large area cooling surface which may be adapted for contact with a chassis or used as convection and radiation surfaces to effect relatively efficient cooling.

According to one aspect of the invention the unitary structure is formed with a substantially circular end cap joining the top of the opposed semicircular walls and coextensive with the bight of the U-shaped portions. According to another aspect of the invention the unitary structure is formed with a slot through a diameter of the circular end plate and the semicircular walls that is substantially perpendicular to the diameter coextensive with the bight of the U-shaped portion. According to still another aspect of the invention, the unitary structure is formed with end walls parallel to the U-shaped portion and separated therefrom by the first and second planar portions to provide an exceptionally large cooling surface area in a relatively compact volume. According to still another aspect of the invention, the unitary structure is formed without the circular end cap but with the slots in the semicircular walls.

According to the method of making the unitary structure, a sheet of material of high thermal conductivity is formed over a punch comprising a cylinder having radially extending blades on opposite sides of the cylinder coextensive with a diameter and the axis of the cylinder and resting on a flat bed. The die is the complement of the punch and is separated from the punch by a sheet to be formed and the punch and die are urged together to form the sheet. Slots or other openings may be punched prior or after forming or preferably may be effected essentially during the forming process by employing dies with suitably located cutting edges.

The usual limitation on the power handling capabilities of a semiconductor device is determined largely by the maximum junction temperature the device can attain without losing its desirable properties. By employing semiconductor cooling devices enough heat may be withdrawn from the device to allow the device to dissipate more power before the critical junction temperature is reached. Thus, by adding a relatively low cost cooling device a low cost semiconductor device may function at power levels associated with uncooled devices of higher cost.

Accordingly, it is an important object of the invention to provide a semiconductor cooling device that efficiently withdraws heat from a thermally contacted semiconductor device.

It is another object of the invention to achieve the preceding object with a cooling device that is relatively compact, lightweight and inexpensive.

It is another object of the invention to achieve the preceding objects with a device that is easy to install.

It is still a further object of the invention to achieve the preceding objects with a device that can be made relatively inexpensively and rapidly with relatively little tooling.

It is still a further object of the invention to provide methods and techniques for achieving devices in accordance with the preceding objects.

Numerous other features, objects and advantages will become apparent from the following specification when read in connection with the accompanying drawing in which.

Figure 1:
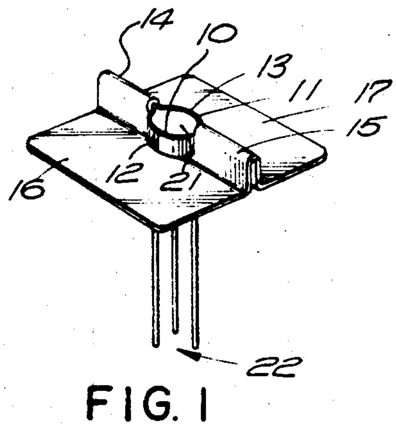
FIG. 1 is a perspective view of an embodiment of the invention open at the top.
Figure 2:
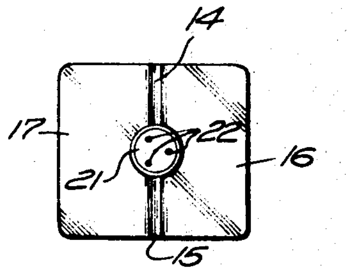
FIG. 2 is a bottom view of the structure of FIG. 1.

With reference now to the drawing and more particularly FIG. 1 thereof, there is shown a perspective view of one embodiment of the invention. The invention comprises a unitary structure formed of material of high thermal conductivity, such as aluminum, and formed with a pair of opposed semicircular walls 10 and 11. Walls 10 and 11 are slotted at 12 and 13, respectively, along a diameter that is perpendicular to the diameter coextensive with the bights of the respective U-shaped portions 14 and 15. U-shaped portions 14 and 15 are separated by the semicircular walls 10 and 11 and extend perpendicularly from and separate the planar portions 16 and 17. The inside surfaces of the semicircular walls 10 and 11 are in good thermal contact with the semiconductor device 21 whose leads 22 are visible. FIG. 2 is a bottom view of the cooler with the attached semiconductor device shown in FIG. 1. The diameter of the cylindrical air space defined by the semicircular walls without the device in place is slightly less than the diameter of the device to be cooled so that insertion of the device deflects the walls to develop a pressure between the device case and the semicircular walls establishing good mechanical and thermal contact.

The cooling device according to the invention has a number of advantages. It achieves good thermal contact with the semiconductor device 21 to be cooled. This occurs because the cooling device establishes thermal contact over a relatively large area of the device, and the resiliency of the semicircular walls 10 and 11 aided by the urging-together forces provided by the U-shaped portions 14 and 15 help establish firm contact between the cooling device and the semiconductor device to help keep thermal resistance low. At the same time the U-shaped portion functions as a cooling surface area. The planar portions 16 and 17 function as cooling surface areas and are especially adapted to contact a metal chassis in which the device is located. Thus the cooling device may function as a convecting and radiating dissipator and a means for establishing a path of low thermal resistance between the semiconductor device and the chassis as well to provide effective device cooling while occupying relatively little additional space.

Figure 3:
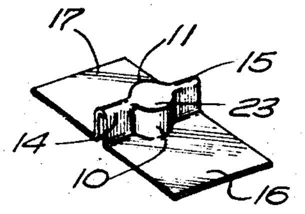
FIG. 3 is a perspective view of a cooling device according to the invention closed at the top.

Referring to FIG. 3, there is shown another embodiment of the invention in which the semicircular walls 10 and 11 are unslotted and covered by a circular end plate 23. Throughout the drawing corresponding elements are identified by the same reference symbols.

Figure 4:
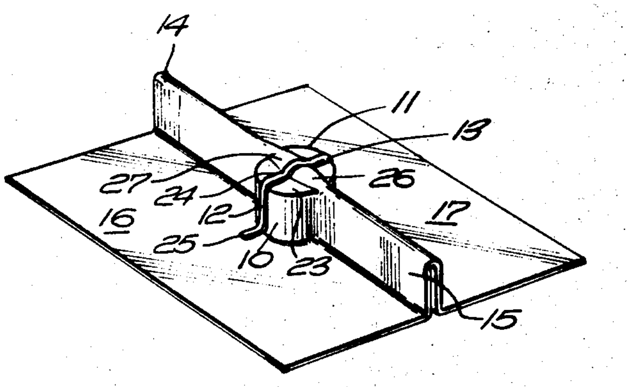
FIG. 4 is a perspective view of an embodiment of the invention in which the central cylindrical portion is slotted.

Referring to FIG. 4, there is shown still another embodiment of the invention somewhat similar to the embodiment of FIG. 3 except that the end cap 23 is slotted at 24, the semicircular walls 10 and 11 are slotted at 12 and 13 which extend into the adjacent planar portions 16 and 17, such as at 25, and the end cap 23 is formed with short portions 26 and 27 of short-legged U-shaped cross section.

Figure 5:
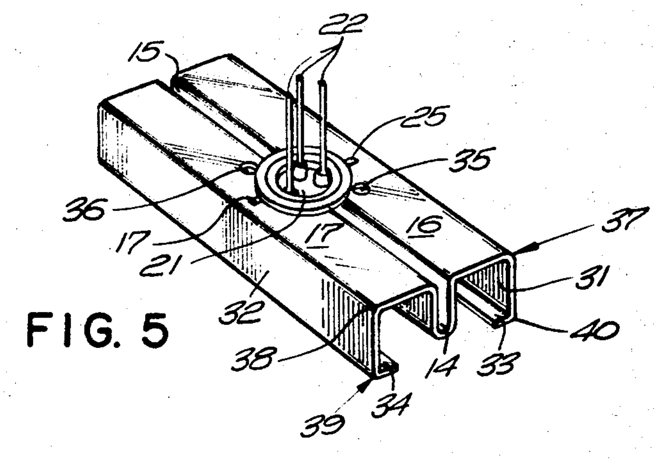
FIG. 5 is a perspective view of still another embodiment of the invention for providing a large cooling area in an exceptionally compact volume.

Referring to FIG. 5, there is shown still another embodiment of the invention somewhat similar to the embodiment described in FIG. 4 except that planar portions 16 and 17 are formed with right angle bends to define a pair of walls 31 and 32, respectively, generally parallel to the U-shaped portions 14 and 15 and inwardly bent flanges 33 and 34, respectively, generally parallel to the plane of planar portions 16 and 17, the height of the walls 31 and 32 typically being of the order of the height of U-shaped portions 14 and 15 and perhaps a little greater. Also shown are two mounting holes 35 and 36 for securing the cooling device to a chassis. Semiconductor device 21 is shown in position and slit 25 in planar portion 16 and slit 37 in planar portion 17 are shown in FIG. 5. The structure of FIG. 5 may thus provide considerable cooling area while taking up relatively little volume.

Devices according to the invention may be made by forming a sheet of aluminum into the shapes shown. Thus, the sheet may be placed over a cylinder resting on a flat bed and urged downward and together by an opposed pair of members having semicircular cutouts conforming to the semicircular walls it is desired to form. The various slots and openings may be punched before, during or after forming in progressive or compound dies. The embodiment of FIG. 5 may be completed by making right angle bends of the device shown in FIG. 4.

Figure 6:
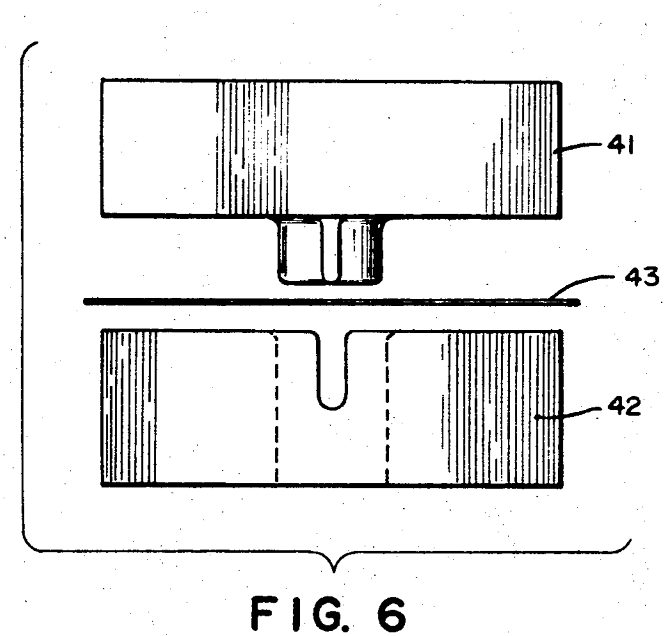
Figure 7:
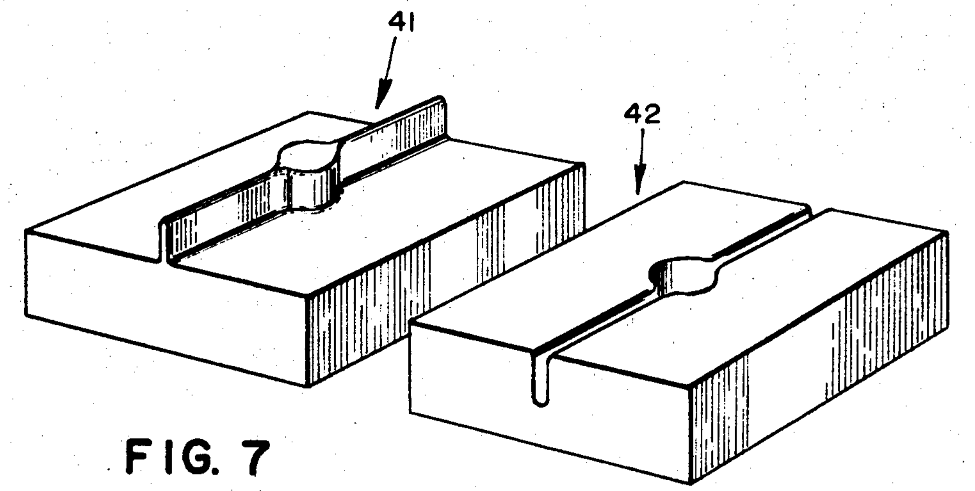

Referring to FIGS. 5, 6 and 7, a preferred method of making devices according to the invention will be described with specific reference to the cooling device of FIG. 5. In a particular commercial method the device of FIG. 5 is being manufactured in a multislide press with tooling so constructed that each cycle of the press produces a finished part. The steps in the method typically occur in sequence as follows.

In the press head portion of the multislide press the U bend 14 and 15 together with the semiconductor cavity walls 12 and 13 and the two right angle bends between the sides of the U and surfaces 16 and 17 are all formed in a single motion between a punch 41 and die 42 operating upon a blank 43. Perspective views of the punch 41 and die 42 are shown in FIGS. 7 and 8, respectively. A successive station in the press head having a cavity slotting die and a shearing slotting blade then generates the slot 25–13–24–12–17. Two punches working together with a blade punch holes 36 and 35 at this station. The part then is transferred into the four slide bending portion of the multislide. After being spring clamped to the king post tool by front slide motion, the piece is parted from the strip at 34 by a cutoff slide, and the front slide continues forward forming the two right angle bends 37 and 38. The left and right slides then act to form the last two bends at 39 and 40. The front, right and left slides all retract, and the king post tool recedes through a stripper plate permitting the finished part to drop free from the machine.

The devices according to the invention are relatively inexpensive yet establish low thermal resistance between the semiconductor device to be cooled and a cooling medium. Tight contact is assured by the resiliency of the opposed semicircular walls urged together by means including the U-shaped portions which also function as effective heat radiating surface areas. The inside surfaces of the semicircular walls provide a large contact area with the device being cooled to further enhance the low thermal resistance of the path between the device being cooled and the cooling medium. Installation of the cooling devices is easy and rapid to establish good mechanical and thermal contact.

It is evident that those skilled in the art may now make numerous modifications of and departures from the specific embodiments and techniques disclosed herein without departing from the inventive concepts. Consequently, the invention to be construed as embracing each and every novel feature and novel combination of features present in or possessed by the apparatus and techniques herein disclosed and construed as limited solely by the spirit and scope of the appended claims.

What is claimed is:

1. Apparatus for cooling a semiconductor device comprising:

a unitary structure of material of high thermal conductivity formed with central opposed first and second substantially semicircular walls extending in one direction from first and second planar surfaces joined by first and second U-shaped portions extending in said one direction perpendicularly from said first and second planar portions and separated by said first and second substantially semicircular walls and comprising means for urging said first and second semicircular walls toward each other for engagement with the casing of a semiconductor device to be cooled.

2. Apparatus for cooling a semiconductor device in accordance with claim 1 wherein said unitary structure is formed with a substantially circular end cap joining the top of said first and second substantially semicircular walls and substantially coextensive with the bight of said first and second U-shaped portions.

3. Apparatus for cooling a semiconductor device in accordance with claim 2 wherein said unitary structure is formed with a slot through a diameter of said circular end plate and said first and second substantially semicircular walls which diameter is substantially perpendicular to the diameter coextensive with said bight of said first and second U-shaped portions.

4. Apparatus for cooling a semiconductor device in accordance with claim 1 wherein said unitary structure is formed with a slot along a diameter of the circle defined by said first and second substantially semicircular walls which diameter is substantially perpendicular to the diameter of said circle substantially coextensive with the bight of said first and second U-shaped portions.

5. Apparatus for cooling a semiconductor device in accordance with claim 1 wherein said unitary structure is formed with end walls substantially parallel to the legs of said first and second U-shaped portions and separated therefrom by said first and second planar portions.

6. Apparatus for cooling a semiconductor device in accordance with claim 5 wherein said unitary structure is formed with a substantially circular end cap joining the top of said first and second substantially semicircular walls and substantially coextensive with the bight of said first and second U-shaped portions.

7. Apparatus for cooling a semiconductor device in accordance with claim 6 wherein said unitary structure is formed with a slot through a diameter of said circular end plate and said first and second substantially semicircular walls which diameter is substantially perpendicular to the diameter coextensive with said bight of said first and second U-shaped portions.

8. Apparatus for cooling a semiconductor device in accordance with claim 5 wherein said unitary structure is formed with a slot along a diameter of the circle defined by said first and second substantially semicircular walls which diameter is substantially perpendicular to the diameter of said circle substantially coextensive with the bight of said first and second U-shaped portions.

References Cited

UNITED STATES PATENTS

| | | | |
|---|---|---|---|
| D. 194,787 | 3/1963 | Chadwick | D26—1 |
| 2,935,666 | 5/1960 | Van Namen | 317—234 |
| 3,240,263 | 3/1966 | Stewart | 165—185 X |
| 2,247,896 | 4/1966 | Chu et al. | 165—185 X |
| 3,260,787 | 7/1966 | Finch | 165—80 X |

ROBERT A. O'LEARY, *Primary Examiner.*

A. W. DAVIS, *Assistant Examiner.*